Sept. 11, 1956 J. J. SLOYAN 2,762,662
SLIDABLE SUPPORTS
Filed April 26, 1951 5 Sheets-Sheet 4
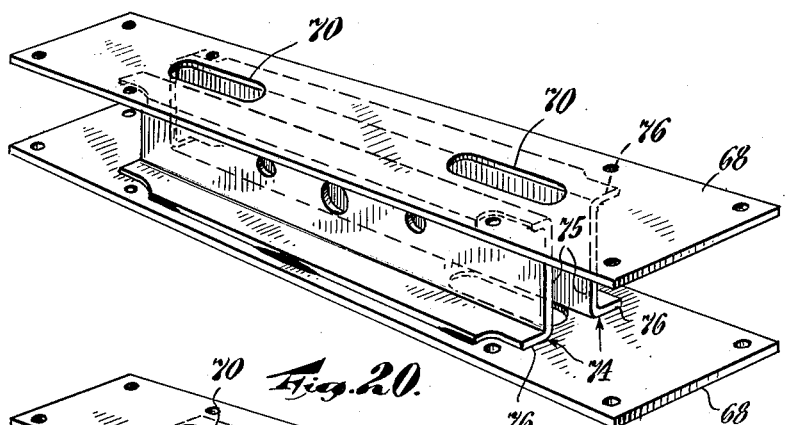
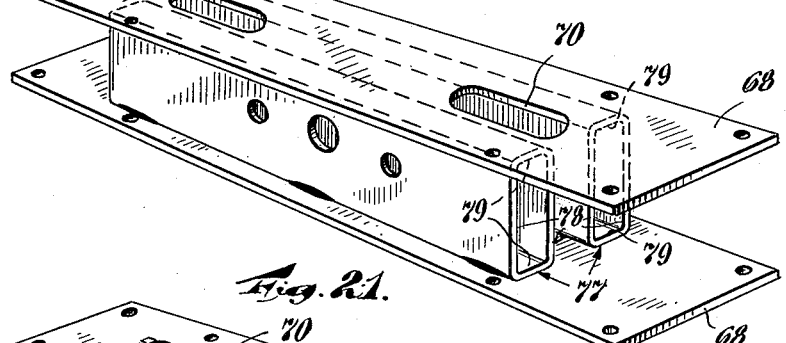
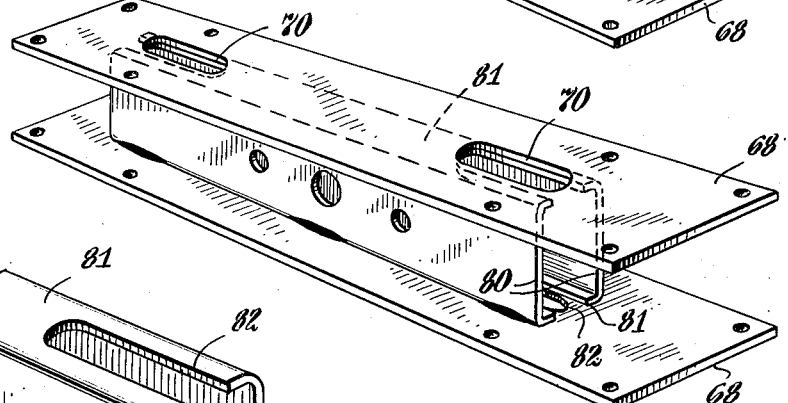
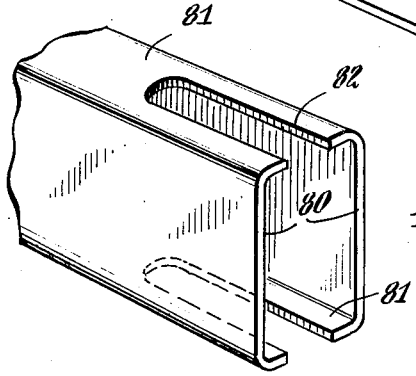
INVENTOR
JEROME J. SLOYAN
BY
Howard P. King
ATTORNEY Sept. 11, 1956 J. J. SLOYAN 2,762,662
SLIDABLE SUPPORTS
Filed April 26, 1951 5 Sheets-Sheet 5
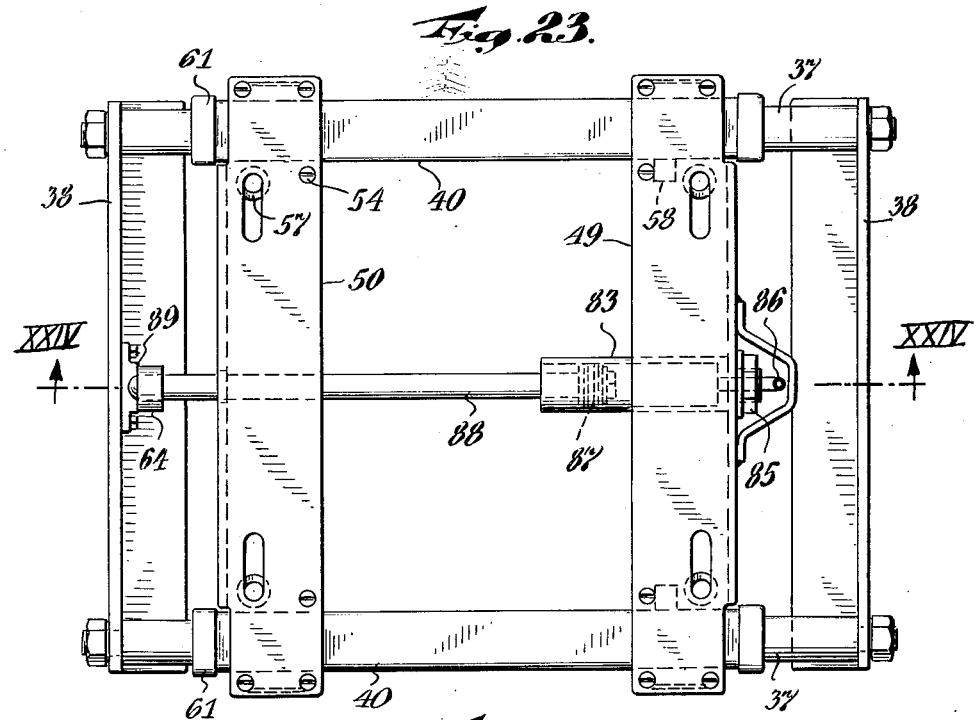
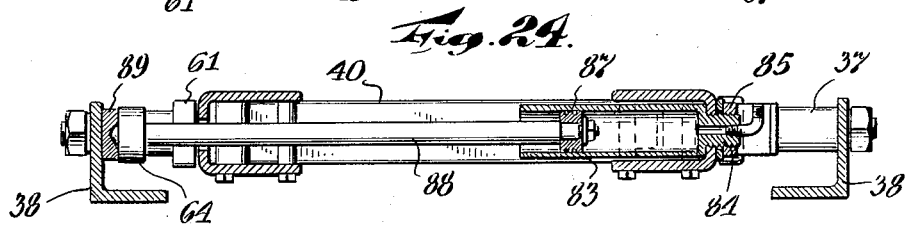
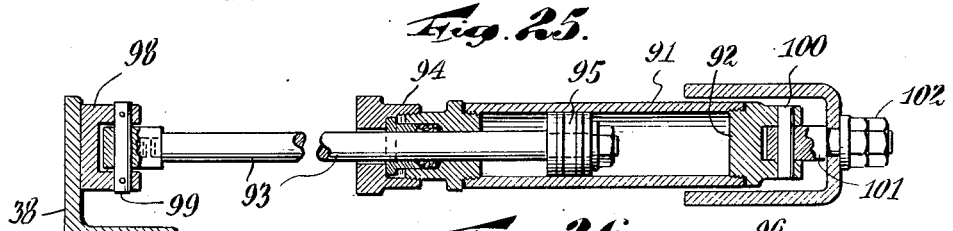
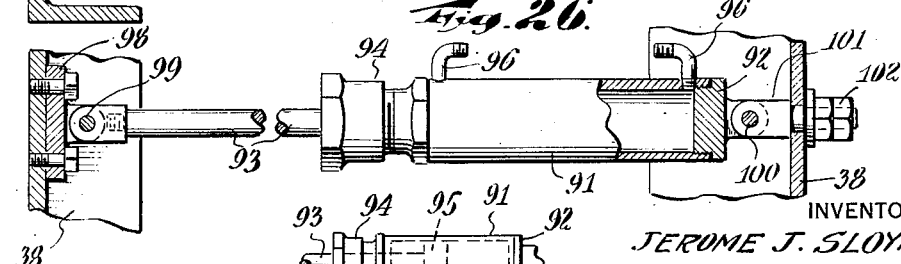
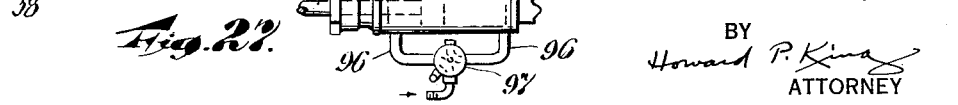
INVENTOR
JEROME J. SLOYAN.
BY
Howard P. King
ATTORNEY United States Patent Office 2,762,662
Patented Sept. 11, 1956

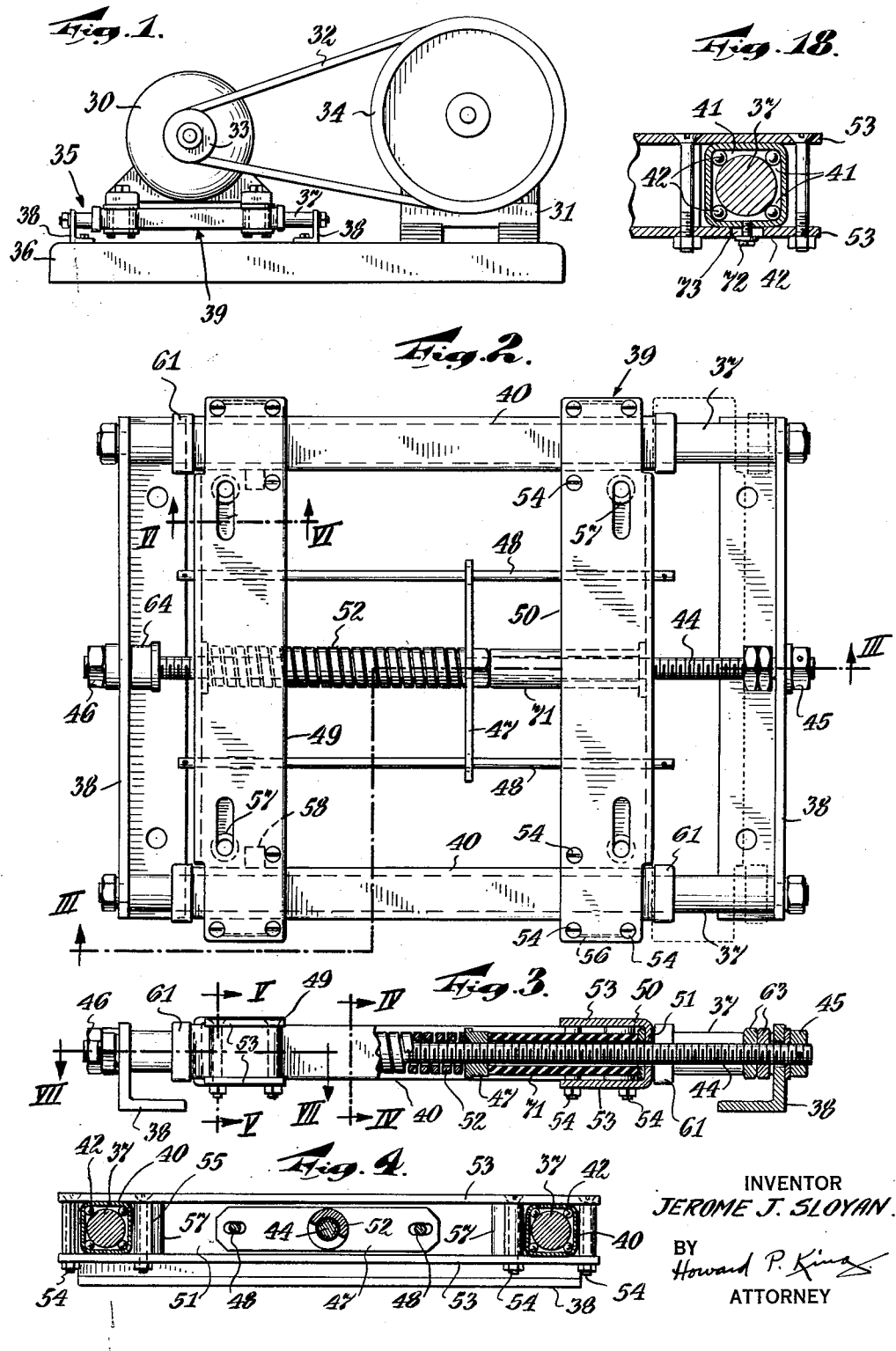

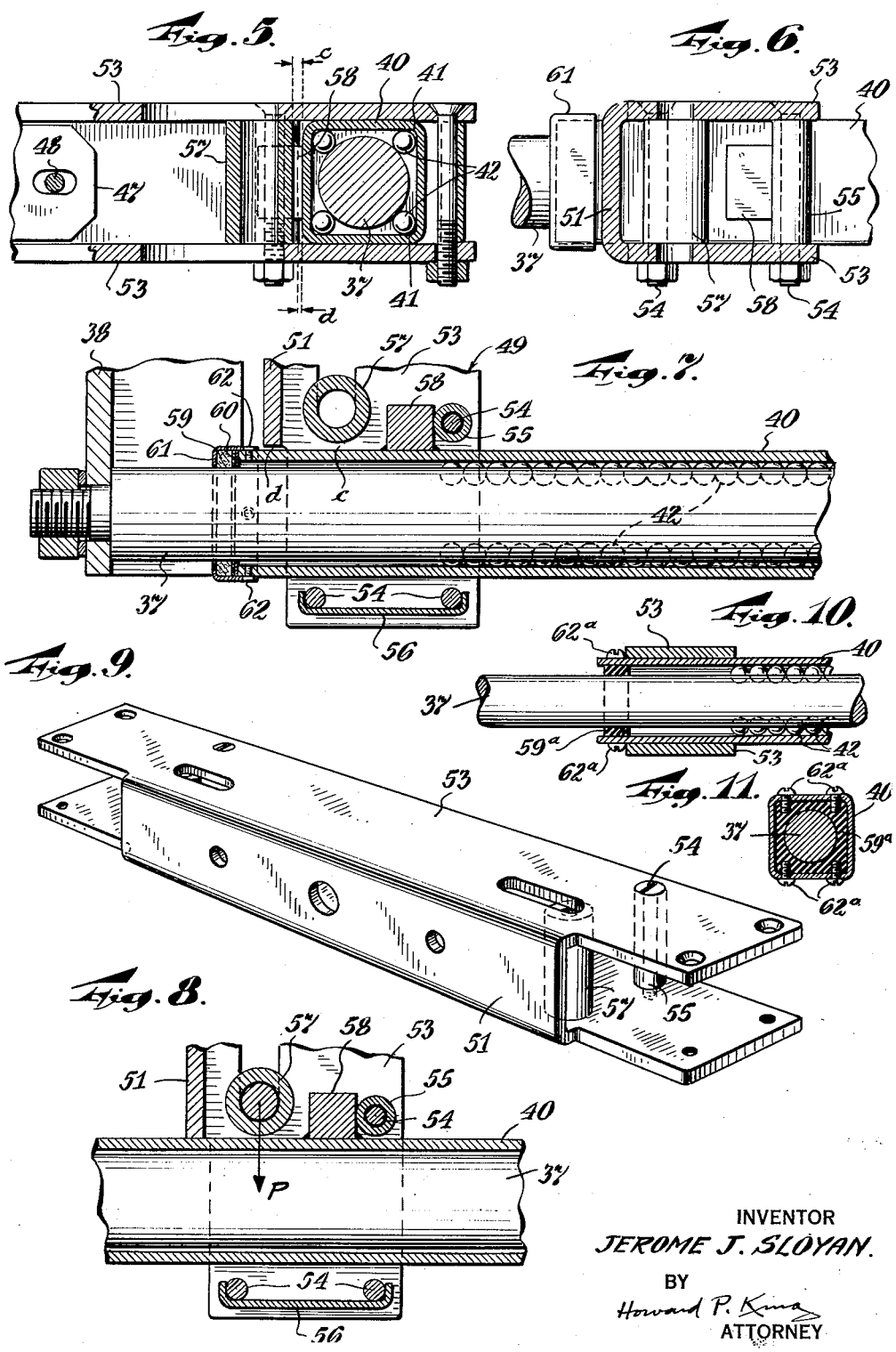

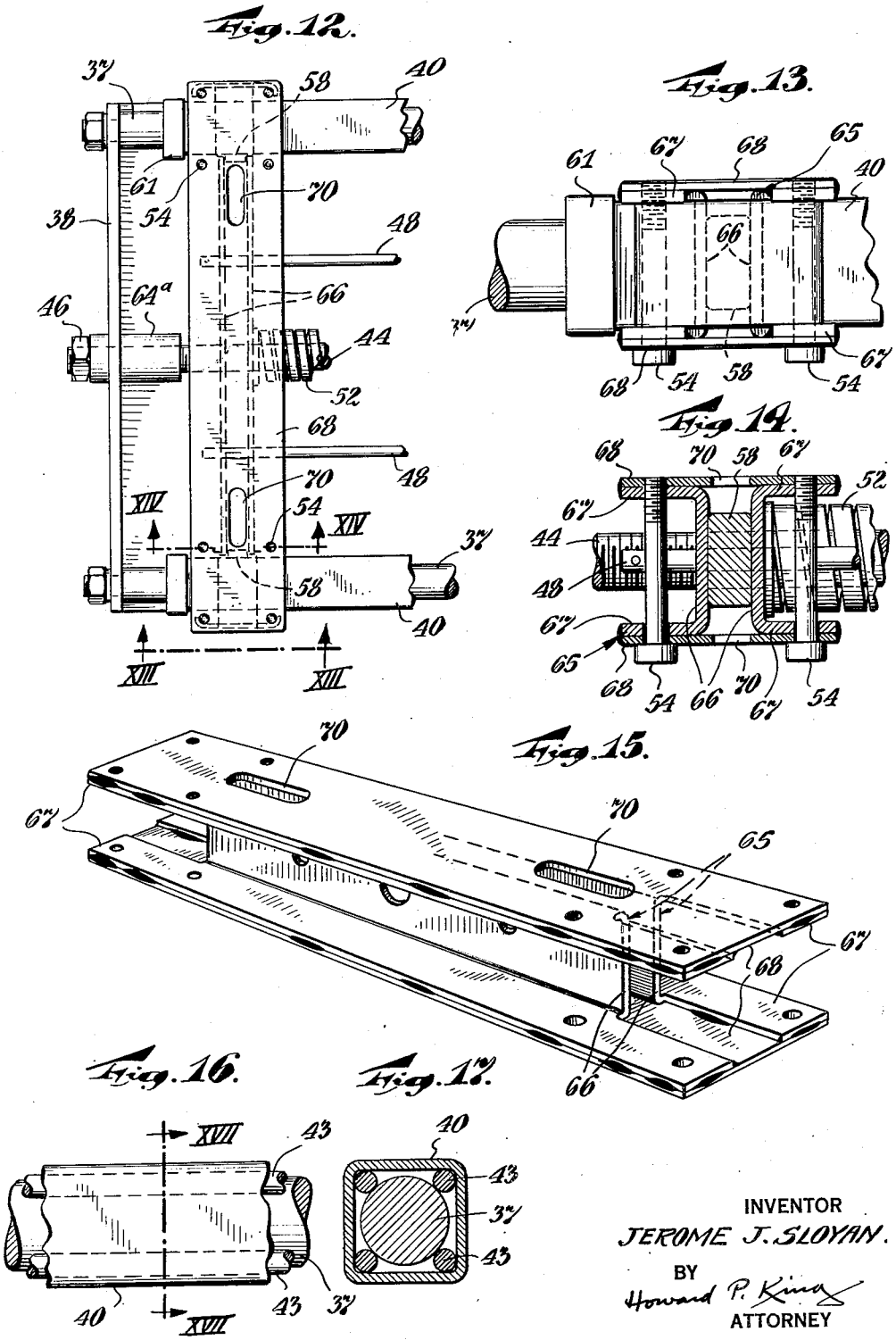

2,762,662

SLIDABLE SUPPORTS

Jerome J. Sloyan, Bloomfield, N. J.

Application April 26, 1951, Serial No. 223,034

10 Claims. (Cl. 308—6)

This invention is a continuation in part and improvement upon the invention disclosed in my prior application Serial No. 117,999, filed September 27, 1949, for supports, and, like the parent case, relates to slidable supports wherein a carriage is provided having a limited movement longitudinally of a track or rail.

The invention has utility in association with various instrumentalities of diverse character of which a motor support has been arbitrarily selected for purpose of specific showing in the accompanying drawings. The essential characteristic of the support of the present invention common to the numerous uses, is that the movable portion of the carriage has linear movement within maximum limits and must slide with minimum friction throughout the prescribed range of its permitted reciprocation. The mechanism includes, and an object of the invention is to provide an improved glider mounted with interposed anti-friction means on the track or rail, and the present invention further contemplates use of a glider formed separately from the body of the carriage and bolted thereto in the assembled support.

Another object of the invention is to obtain tight clamping of the cross-members of the carriage to the gliders and yet to maintain free operation of the glider under conditions of tight clamping of the cross-members thereto.

The invention proposes fulfillment of its objectives with use of materials available on the market and yet to obtain therewith exactitude of inter-engagement of the parts of the assembly.

A still further object of the invention is to provide for controlled fluid pressure activation of the carriage.

Yet another object of the invention is to not only utilize materials of pre-fabricated character, such as rectangular tubing, channels, I-beams and the like, but to minimize additional fabrication operations in organizing the assembly, and to utilize readily performed processing for such fabrication operations as required.

Other objects of the invention will become apparent to persons skilled in the art to which it appertains as the description proceeds, both by direct recitation thereof and by implication from the context.

Referring to the accompanying drawings, in which like numerals of reference indicate similar parts throughout the several views:

Fig. 1 is a side elevation of my invention on which is carried a motor having belt drive to a driven instrumentality;

Fig. 2 is a plan of one embodiment of the support;

Fig. 3 is a longitudinal sectional elevation on line III—III of Fig. 2;

Figs. 4 and 5 are cross-sections on lines IV—IV and V—V respectively of Fig. 3;

Fig. 6 is a sectional view on line VI—VI of Fig. 2;

Fig. 7 is a sectional view on line VII—VII of Fig. 3;

Fig. 8 is a view similar to Fig. 7 under different load conditions;

Fig. 9 is a perspective view of one embodiment of cross-member for the carriage;

Fig. 10 is a fragmentary sectional view longitudinally of and at the end portion of a glider, showing a different embodiment of sealing means therefor;

Fig. 11 is an end view of the said glider and sealing means of Fig. 10;

Fig. 12 is a fragmentary plan similar to Fig. 2, and showing a modified embodiment of cross-member;

Figs. 13 and 14 are cross-sections on lines XIII—XIII and XIV—XIV respectively of Fig. 12;

Fig. 15 is a perspective view of said modified embodiment of cross-member;

Fig. 16 is a longitudinal elevation of a part of a rail and glider utilizing modified construction of anti-friction means therebetween;

Fig. 17 is a cross-section on line XVII—XVII of Fig. 16;

Fig. 18 (Sheet 1) is a cross-section of a rail and glider, with attached cross-member, and showing means for retaining the glider and cross-member assembled;

Figs. 19, 20 and 21 are perspective views of three further modified constructions of cross-members;

Fig. 22 is a perspective fragmentary view of the web element utilized in the modification of Fig. 21;

Fig. 23 is a plan of a modified embodiment of support;

Fig. 24 is a sectional view longitudinally of a piston and cylinder actuating means of Fig. 23, taken on line XXIV—XXIV thereof;

Fig. 25 is a sectional view similar to Fig. 24 and showing a double-ended cylinder;

Fig. 26 is a sectional plan of Fig. 25; and

Fig. 27 is a plan of the double-ended cylinder of Figs. 25 and 26 and showing a three-way valve for the fluid control to said cylinder.

As an arbitrarily selected exemplification of the invention in one use thereof the general organization of Fig. 1 illustrates an electric motor 30 driving any desired instrumentality 31 through the agency of a belt 32 and pulleys 33 and 34 respectively on the shafts of said motor and instrumentality. While it is intended that the support herein described may be used in conjunction with a variable pitch pulley, it may also be used to maintain belt tension in applications where both the driving and driven pulleys have fixed diameters. In the latter circumstance the spring is provided in the support of the present invention; in the former, the spring is in the variable pitch pulley and movement of the carriage is by direct connection, by the screw or equivalent means, for movement of the carriage both forwardly and rearwardly. An example of direct connection for movement both ways and retention of the carriage at the position to which it is moved is included herein with the showing of Figs. 25–27, and figures prior thereto show the carriage as having means in the support for keeping the belt under tension for use with fixed diameter pulleys. In general, the motor is representative of a movable or adjustable mechanism.

An essential feature of the present invention resides in the construction of a support 35 for the said mechanism. As shown, a bed 36 is provided to which the fixed instrumentality is secured, and to which a fixed portion of the support of the present invention is also secured, it being understood that said bed is representative of any structure, such as floor, table, wall, shelf, ceiling, or the like which will afford relatively fixed mounting for the aforementioned fixed instrumentality and fixed portion of the support.

The fixed portion of the support as herein illustrated, comprises two parallel rails 37 the ends of which are made fast to transverse cleats 38 which may conveniently be formed from appropriate lengths of angle iron one flange of which forms a foot juxtaposed to and adapted to be secured to bed 36 and the other flange of which stands perpendicularly and constitutes an end abutment and rigid support for the said rails. The assembly of rails and cleats forms a rectangle of which the cleats will arbitrarily be referred to as at the ends and the rails as at the sides of the rectangular assembly constituting the fixed or basal portion of said support.

The movable portion of the support comprises a carriage 39 having slidable movement longitudinally of the rails, said carriage having gliders 40 at its opposite side margins cooperating with the rails to not only provide for sliding of the carriage on the rails but to also keep the carriage assembled upon said rails. Each glider is conveniently comprised of rectangular or square tubing the inside diameter of which is greater than the diameter of the rail which it envelops.

By the use of a cylindrical rail within rectangular or square tubing, there will be a space between the adjacent or meeting walls at each corner of the tubing and the cylindrical face of the rail, and the portions of the walls and rail defining that space may be termed and function as a receptacle or raceway 41, in general terms, which may be considered as comprised of an outer raceway formed by the tube walls and an inner raceway formed by the rail surface toward each corner of the tubing.

Antifriction means are provided between the rails and the said gliders or tubes, and in one embodiment of the invention, balls 42 are introduced into and retained in said raceways as illustrative of such antifriction means. The carriage 39 has a limited longitudinal movement, the range or amplitude thereof being confined approximately to the difference between the length of the rail and length of the tube or glider. In order for the balls to function as intended, that is, to roll in the raceways and thereby permit the tubes or gliders to move freely for their allotted amplitude longitudinally of the rails, it is essential that the raceways or receptacles be not filled with balls for their entire lengths. The length not having balls may be called for convenience the void length of the race, and this void length need not be more than one half of the distance it is intended the tube will travel.

While the use of antifriction means, such as balls in an annular race, is a matter of common knowledge, yet it is recognized that the balls in that type of race have a continuous or non-ending path enabling the movement to be cyclic so all of the balls can roll without interruption, and therefore poses no problem. But in the support of the present invention, the path of the balls is linear, and hence the total amount of displacement is subject to limitation.

Since the normal displacement of the balls along the rail will be practically equal to one half of the displacement of the glider, and since the displacement of the balls along the glider will be closely equal to one-half the displacement of the glider, but in a direction opposed to the direction in which the glider is displaced, a sufficient void or space lengthwise of the race is provided to enable the balls to roll without interruption for the full displacement of the glider on the rail between the limiting stops. Just enough balls are included within each race in proportion to the maximum travel distance of the glider to permit them to roll uninterruptedly and at the same time afford maximum load-carrying capacity for the carriage. A lesser number of balls would of course reduce the load-carrying capacity and would afford support beneath a less length of the carriage.

For nicety of action, it is important that four sets of balls be provided in each tube and rail assembly, that is, one set in each corner of the tube, and also that they have a reasonably good fit so the tube does not have any material lateral movement with respect to the rail. It is furthermore within the province of the present invention to preload the balls, that is to say, the race is made tight for the balls so there will be pressure applied to the balls before addition of the load to be carried by the carriage. This assures contact of all of the balls with the race so that all will roll and none will merely slide along.

Where economy is a factor, and the anti-friction quality of a linear ball bearing is not imperative, cylinders or rods 43 (Figs. 16 and 17) practically the length of the tubes may be inserted in the receptacles or raceways above described, instead of balls. Use of rods or cylinders in the receptacles or races has its highly practical aspects. The size of commercial steel tubing is determined by its outside diameter and the wall thicknesses, less than $3/16$ of an inch usually being given in terms of Stubs gage, and having the following equivalents in decimal parts of inches, viz:

11 ga.=.120
12 ga.=.109
13 ga.=.095
14 ga.=.083

Commercial sizes of round finished steel are usually by sixteenths of an inch. Consequently, it would be almost impossible to choose from commercial materials a rail and a tube that would fit well. Whereas, after first determining the rail diameter required to withstand a given stress, it is possible to ascertain a tube and ball or tube and rod combination that will provide a reasonably good fit. Balls come in multiples of $1/32$ of an inch. Round steel, in small sizes, such as would be used in the races of the riders, comes in multiples of $1/64$ of an inch. Drill rod in millimeter sizes is also obtainable. Because of these available sizes, the simplest arrangement is to employ rods as the antifriction means. The rods may have a length equal to that of the tube in which located; the sliding of the glider on the rail takes place with the line contact of the rod on the rail. In any particular mounting of the support, as on floor, side wall or ceiling, two of the rods in each glider will make line contact with their rail and carry the weight of and support the carriage and motor.

If so desired, the rods may be made shorter than the glider tubes so as to leave voids in the raceways, so the rods will "float" much the same as the series of balls, thereby enabling some sliding to occur between the glider walls and the rods and some between the rods and the rail.

Operation of the carriage, both to change its location and provide the required belt tension may comprise, as shown in Figs. 1 to 4, a worm or plurality of worms 44 parallel to and between the rails and with the ends of the worm projecting through the end cleats 38. One end of the worm is provided with a nut or other means 45 pinned or fixed thereon, which constitutes an operating means and also a means for preventing longitudinal displacement of the worm in a rearward direction away from the nut. The other end of the worm is shown provided with a nut 46 pinned thereon which prevents longitudinal displacement of the worm in the other or forward direction and also constitutes a duplicate operating means for the worm. Said worm is in threaded engagement with like threads in a hole provided for the purpose in a yoke or follower 47 extending in a direction crosswise of the carriage and suitably prevented from rotating with the worm, as by slidable engagement with fixed guide rods 48 parallel to and on the opposite sides of the worm. Since the worm is prevented from displacement longitudinally, rotation thereof obtains shifting of the yoke forwardly or rearwardly in accordance with direction of rotation of the worm. The directions of forward and rearward are arbitrarily used herein to designate movement toward or away from the instrumentality driven by the motor, being carried by the support.

The carriage body as herein illustrated comprises two cross-members the end margins of which are secured to the two gliders. One of these cross-members 49 is secured at the rear end regions of the gliders and provides means for attachment of the rear feet of the motor thereto, and the other cross-member 50 is adjustable, to agree with the front-to-back foot spacing of the applied motor, and provides means for attachment of the forward feet of the motor thereto. Though the cross-members may be variously constructed, each provides a part or web 51 crosswise of and having free passage for the worm 44 therethrough, and thereby one member, here shown as the rear one 49, provides means for engagement by the rear end of a spring 52 thereagainst, said spring being mounted on the worm and extending forwardly to the aforementioned yoke. Operating the yoke to compress the spring will thereby apply tension to the driving belt between the motor and driven instrumentality.

The particular construction of cross-members as shown in Figs. 2 to 9, each comprises a metallic channel with parallel longitudinal flanges 53 connected each to the other at one longitudinal edge of each by a longitudinal web 51 which has been referred to above as the web through which the worm passes. Said web has less length than the flanges, the web length being just sufficient to admit it lengthwise in the space between and perpendicular to the gliders 40. The flanges, however, overlap and project at their ends beyond the gliders, the dimensions of the web and gliders being related so that each glider will just fit between the pair of flange ends of the cross-member.

Bolts 54 extending from one flange to the other in vicinity of the glider provide clamping means for securing the member to the glider. As shown, one bolt 54 is next the inner side of the glider and next the edge of the flanges opposite from the web, and two bolts are shown at the outer side of the glider and next the opposite corners of the flanges. These last-mentioned bolts will, in practice, draw the ends of the pairs of flanges toward each other and in effect create a trapezoidal configuration which will prevent inward displacement of the cross member. However, to prevent tightening said bolts to such extent that the glider would be deformed, suitable limiting means may be provided such as sleeve 55 on the single bolt 54 and spanning clip 56 on the pair of bolts, having dimensions between flanges slightly less than the dimension of the glider. It may also be mentioned in this connection that sleeves 57 for the motor-attaching bolts may also be provided to prevent distortion of the flanges or lessening of the flange spacing when those bolts are tightened in mounting the motor. Outward displacement of the member is limited by engagement of the end of the web with the glider rather than by engagement of the bolts or sleeves thereon with the glider as in Fig. 8.

Both as an aid in assembly and to maintain perpendicularity of the cross-members on the gliders, each glider preferably has a lug or stop 58 at its inner side, said lug being accurately located to engage against the side of sleeve 55 on the inner bolt 54 of one cross-member 49, the lugs on the two gliders both being positioned to function in conjunction with the same cross-member. Thus the lugs are provided only for the non-adjustable cross-member so adjustment of the other member to proper position as required by motor foot spacing, will not be hampered.

Means may be provided for retaining a lubricant, such as oil or grease, within the tubular glider in the races thereof, and to exclude dust. As shown more especially in Fig. 7, a felt washer or other pad 59 is applied around the rail and at the end of the tubular glider. A fiber or other washer 60 is located against the end of the glider to substantially close the end opening thereof around the rail and the said pad is contained in a cap 61 which confines it in the region within the cap next said washer. The cap may be held in place by snapping over stud heads 62 or other projections provided for the purpose on the outer margin of the glider. The washer constitutes a convenient means, likewise, for retaining balls from escape at the ends of the races.

It is desirable to avoid jamming the caps 61 between the ends of the gliders 40 and the cleats 38 carrying the rails when the gliders come to the ends of their reciprocable path of movement on the rails. This desideratum can be accomplished by including stop means on the worm 44, in exemplification of which a pair of nuts 63 are shown next the inside face of the upstanding flange of one cleat 38 and engageable by the approaching face of the carriage cross-member web 51; the other end of the worm has a sleeve or nut 64 thereon serving the same purpose between the adjacent cleat and carriage.

A modified construction from that shown in Fig. 7 for the ball and lubricant retaining and dust excluding means is shown in Figs. 10 and 11. In this instance a washer or pad 59ᵃ is provided which fits within the glider next the end thereof, this washer also having a central opening to admit passage of the rail therethrough. Said washer is properly proportioned to make closure contact at its outer periphery with the interior faces of the several walls of the glider and to make closure contact at the periphery of its opening with the outer circumference of the rail so as to fully seal lubricant within the glider and exclude dust from entry into the glider. While various materials may be used to compose said washer, it is desirable to employ one which is rigid or semi-rigid, for instance, of the nature of hard rubber, of which a synthetic material available on the market under the trade name of "Neoprene" has proved very satisfactory. Said washer 59ᵃ may be retained in its assembled location in the glider by means of four screws 62ᵃ introduced at the corners thereof through the several walls of the glider. Presence of the washer in the rider retains the balls or other antifriction means from undesired displacement and the proximity of the screws 62ᵃ to the line of travel of the antifriction means obtains a solid stop for the said antifriction means. The heads of said screws preferably protrude from the outer surfaces of the tubes comprising the gliders and serve the further purpose of stops or location means for the mounting of the cross-member flanges on the riders, eliminating necessity for inclusion of the specific lugs 58 previously described in connection with Fig. 7, said screw heads performing the function of said lugs.

For use with larger or with more powerful motors, a more substantial cross-member may be found necessary or desirable, such as the one illustrated in Figs. 12 to 15. Essentially said cross-member of this showing corresponds to that previously described, but utilizes two channel members 65 the webs 66 of which are, with space between, parallel to each other, and the flanges 67 of which are directed away from each other with the pair of top flanges in a common plane and the pair of lower flanges in a common plane. The pair of top flanges are secured, as by welding, to a plate 68 overlying both flanges and spanning the gap between the channels. A similar plate 68 underlies and spans between the bottom pair of flanges and is welded or otherwise secured thereto. The channels and plates thus assembled constitute an I-beam of which the web is hollow and constituted by the spaced webs of the channels. The ends of the flanges, as before, together with the ends of said plates 68, project beyond the ends of the webs and may therefore be similarly deflected to trapezoidal relation in attachment to the gliders.

As with the previously described construction, and similarly as an aid in assembly and to maintain perpendicularity of the fixed cross-member on the gliders, each glider has a lug or stop 58 at its inner side, with which the web of the fixed cross-member engages.

The top and bottom plates 68 of the cross-member of Figs. 12 to 15, are provided with appropriately related slots 70 registering with the gap between webs 66 to accommodate bolts for attaching the motor. The webs also have properly located holes therein for passage of worm 44 and rods 43 above described. The construction of worm, operating means, yoke and associated parts may be duplications of those heretofore described, except that the stop sleeve 64ᵃ on the worm in this instance is longer than in the previous showing so as to reach the web 66 which now is located at the inner edges of the flange. In each construction, the worm 44 is shown with a spring 52 thereon, said spring being compressed between the yoke 47 at the inner end of the spring and the web of the cross-member. Also in each construction, it is preferable to provide a spacing sleeve 71 on the worm at the part thereof traversing the space between the yoke and the other cross-member opposite from the one engaged by the spring. This spacing sleeve 71 will both limit retraction of the yoke in the carriage and will also enable positive retraction of the carriage to be effected by appropriate turning of the worm, when so desired, as for instance when it would be necessary to displace the motor toward the instrumentality in order to change a group of V-belts more readily. Said spacing sleeve 71 is preferably flexible, instances of which are rubber or combination of rubber and fabric.

I do not intend by the foregoing description to indicate locating lug 58 on the glider to be the only possible means for effecting proper location and perpendicularity of the cross member on the glider. For instance, in Fig. 18, an alternative means is illustrated and constitutes a locating or positioning screw 72 the shank of which passes through one flange 53 or other part of the cross-member where juxtaposed to the glider, and screws into the glider wall. The flange is slotted for reception of the screw, as at 73, for enabling the glider and cross-member to be adjusted to perpendicular relation before clamping.

Furthermore, other assemblies to provide flanges and webs may be utilized in construction of members than the ones heretofore described. For instance, in considering the modification of Figs. 12 to 15, it is within the scope of the present invention to utilize the plate ends as the entire trapezoidal clamping end of the cross-member without extending the flanges of the channels to accomplish this feature of gripping engagement. This proposal is illustrated in Fig. 19. The channels 74 therein shown have their webs 75 parallel and spaced and of correct length for location from glider to glider just as heretofore described for the webs of the preceding figures. The flanges 76 of these channels are, however, of just the same length as the web. The said flanges are welded or otherwise secured to plates 68 which projects beyond the web and flanges, and the projecting ends of the plates are adapted to be juxtaposed across and grippingly bolted with trapezoidal deflection on the gliders.

As a further modification within the inventive concept hereof, an additional web may be provided for each channel, which in effect utilizes two rectangular tubes 77 as shown in Figs. 20 in place of the open channels of Fig. 19. By this construction, four vertical webs 78 are provided. These webs, in pairs, have flanges 79 in common, thereby resulting in the afore-mentioned rectangular tubes. Plates 68 are welded or otherwise secured to these flanges 79 in like relation to the plates, flanges and webs of previously described Fig. 17.

From consideration of Figs. 19 and 20, it will be appreciated that a further modification may provide a pair of webs 80, as in Fig. 21, with flanges 81 in common to the said pair of webs as the body structure interposed between two plates 68. In this instance, the ends of the flanges 81 are slotted, as at 82, with those slots in registration with the motor-bolt slots 70 of the plates, one of the slotted ends being shown in Fig. 22 before attachment of the plates thereto which is done subsequently as by welding the plates to said flanges.

An additional feature of the invention, is the provision of fluid actuation of the carriage as exemplified in Figs. 23 to 27 inclusive. For illustrative purposes, the general rectangular base construction of Figs. 1 to 4 is arbitrarily selected for the showing of this additional feature, so it is to be understood that various parts previously described, inclusive of rails 37, cleats 38, gliders 40 and antifriction means therefor, cross-member 49 fixed on the gliders and cross-member 50 adjustably secured to the gliders may be used and previous description thereof will suffice.

Referring specifically to Figs. 23 and 24, cross-member 49 of the carriage which has its relation to the gliders 40 fixed by lugs 58, has a fluid-pressure cylinder 83 secured thereto and located parallel to and medially between said gliders. Said cylinder has its closed or head end next the web of said cross-member and secured thereto, as by a threaded neck 84 projecting through the web and secured by a nut 85. Said neck is hollow and has a pipe-fitting 86 threaded thereinto, said pipe-fitting being representative of any appropriate connection to a source of fluid pressure. Within the cylinder 83 is a piston 87 from which a piston rod 88 projects to and through the opposite or adjustable cross-member, which acts as a guide therefor, and to the cleat 38 therebeyond. That cleat has a bracket 89 thereon in opposition to the end of the piston rod, and is preferably provided with a hollow seat or socket for the end of the piston rod. As fluid pressure is introduced into the cylinder, the piston rod seats in the socket of the bracket and the carriage is moved in a direction away from the bracket, thereby functioning to apply a tension on the belt. Release of the fluid pressure will permit the carriage to move in the reverse direction, for instance thereby relieving the tension in the belt between the motor and driven instrumentality.

If desired to actuate the carriage in both directions with fluid pressure, a double-ended cylinder may be employed as shown in Figs. 25 to 27 inclusive. According to this embodiment, cylinder 91 has a closure or head 92 at one end and a piston rod 93 projecting through a stuffing-box closure 94 at the other end. A piston 95 on the inner end of the piston rod can reciprocate between those end closures by introduction of fluid pressure at either end through pipe fittings 96 connecting with a three-way valve 97 and source of fluid pressure. The valve admits pressure to one end of the cylinder and releases the pressure from the other end.

Since the piston rod exerts alternatively push and pull, the bracket 98 therefor at the cleat 38, is shown bolted to the cleat and as having a swivel connection 99 with the piston rod. The cylinder head also preferably has a swivel connection 100 with a stud 101 projecting through the cleat 38 next that end of the carriage, said stud being secured by nuts 102 thereon and projecting beyond the web of the cross-member to constitute a safety stop for movement of the carriage toward the cleat.

This last-described double-acting fluid piston arrangement is intended primarily to vary the distance between the motor and the instrumentality and then to maintain such distance to thereby effect and maintain whatever speed ratio of drive for the instrumentality desired. Said instrumentality is, therefore, in this arrangement, equipped with a variable pitch pulley.

While the present showing illustrates the invention in its more simple embodiments, it is to be understood that the number of rails and gliders is not restricted to the arbitrarily selected embodiment, and representation of two rails and two gliders is illustrative of the broad concept of a plurality of rails and gliders having the load stress directly thereover. Consequently, the invention contemplates construction of supports for movably mounting mechanisms of relatively light weight, such as several pounds, up to mechanisms of great weight of a ton or more.

I claim:

1. A support comprising parallel rails, rectangular tubular gliders on said rails, said gliders having parallel side walls longitudinally of said rails keeping the gliders from sagging, and a webbed cross member extending between said gliders and overlapping said side walls of the gliders with ends of the web of the cross member substantially in engagement with said side walls of the gliders whereby the gliders are prevented from twisting on the rails and distribute weight applied to the cross member over extended lengths of the rails.

2. A support comprising parallel rails, tubular gliders on said rails, and a webbed cross member extending between and overlapping said gliders with the ends of the web of the cross member substantially in engagement with said glider, and interengaging stop means projecting from the glider and cross member for locating the cross member in perpendicular relation to said gliders.

3. A support comprising parallel rails and a carriage movably mounted thereon, said carriage having rectangular tubular gliders on the rails, said gliders having parallel side walls longitudinally of said rails keeping the gliders from sagging, cross members between the gliders having rigid attachment thereto whereby weight applied to said cross members is distributed over an extended length of the glider without twisting or bending the glider, anti-friction means in the gliders, closure means at the ends of the gliders for retaining said anti-friction means and lubricant in the said gliders, and stop means for the carriage projecting inwardly toward the carriage between the rails and interposed in the path of movement of the cross member to engage and limit movement thereof with the ends of the gliders and closure means thereon still away from the ends of the rails.

4. A support comprising parallel rails and a carriage movably mounted thereon, said carriage having rectangular tubular gliders on said rails, said gliders having parallel side walls longitudinally of said rails keeping the gliders from sagging, and webbed cross members extending between said gliders, said webbed cross member comprising a channel having flanges in planes parallel to said rails and gliders, said web extending in its lengthwise direction crosswise of the gliders to span the space between said gliders, said flanges having greater lengths than the webs at both ends of the webs and overlapping said side walls of the gliders with the ends of the webs of the cross members substantially in engagement with said side walls of the gliders whereby the gliders are prevented from twisting on the rails and distribute weight applied to the cross members over extended lengths of the rails.

5. A support comprising parallel rails and a carriage movably mounted thereon, said carriage having rectangular tubular gliders on said rails, said gliders having parallel side walls longitudinally of said rails keeping the gliders from sagging, and cross members extending between said gliders, each said cross member comprising a web extending in its lengthwise direction crosswise of the gliders to span the space between and perpendicular to said gliders, said cross members having a plate perpendicular to the webs longitudinally overlying the same and fixed thereto, said plate having greater length than the web at both ends of the web of each said cross member and overlapping said side walls of the gliders with the ends of the webs of the cross members substantially in engagement with said side walls of the gliders whereby the gliders are prevented from twisting on the rails and distribute weight applied to the cross members over extended lengths of the rails.

6. A support comprising parallel rails and a carriage movably mounted thereon, said carriage having rectangular tubular gliders on said rails, said gliders having parallel side walls longitudinally of said rails keeping the gliders from sagging, and cross members extending between said gliders, each cross member comprising a plurality of parallel webs extending lengthwise between and perpendicular to the gliders with the ends of the webs of the cross members substantially in engagement with said side walls of the gliders whereby the glider are prevented from twisting on the rails, said cross members having a plate perpendicular to the webs longitudinally overlying the same and fixed thereto, said plate having greater length than said webs at both ends of the webs and overlapping the side walls of the gliders in engagement with the gliders to thereby distribute weight applied to the cross member over extended lengths of the rails.

7. A support comprising parallel rails and a carriage movably mounted thereon, said carriage having rectangular tubular gliders on said rails, said gliders having parallel side walls longitudinally of said rails keeping the gliders from sagging, and cross members extending between said gliders, each cross member comprising a plurality of spaced and parallel webs having flanges at the longitudinal edges thereof extending away from the space between the webs, said cross member having a plate flatwise on said flanges overlapping said side walls of the gliders with ends of the web of the cross members substantially in engagement with said side walls of the glider whereby the gliders are prevented from twisting on the rails and distribute weight applied to the cross members over extended lengths of the rails.

8. A support comprising parallel rails and a carriage movably mounted thereon, said carriage having rectangular tubular gliders on said rails, said gliders having parallel side walls longitudinally of said rails keeping the gliders from sagging, and cross members extending between said gliders, each cross member comprising a tubular structure perpendicular to and extending longitudinally across from one glider to another glider with the ends of said tubular structure substantially in engagement with said side walls of the gliders whereby the gliders are prevented from twisting on the rails, and said tubular structure having a plate secured thereon, said plate having greater length than said tubular structure and overlapping said side walls of the gliders whereby weight applied to the cross members is distributed over extended lengths of the rails.

9. A support comprising parallel rails and a carriage movably mounted thereon, said carriage having rectangular tubular gliders on said rails, said gliders having parallel side walls longitudinally of said rails keeping the gliders from sagging, and cross members extending between said gliders, each cross member comprising a pair of plates with one plate overlying and the other underlying at their ends the said gliders, and comprising a tubular web structure medially between longitudinal edges of said plates secured to both said plates and extending from one glider to the other substantially in engagement with said side walls of the gliders whereby the gliders are prevented from twisting on the rails and distribute weight applied to the cross member over extended lengths of the rails, and said tubular web and plates having registering slots therein adapted to pass bolts adjustably therethrough.

10. A support comprising parallel rails, rectangular tubular gliders movably mounted on said rails, the wells of said gliders extending longitudinally of the rails, two walls of each glider being substantially parallel and constituting side walls thereof, and both said side walls of both gliders being substantially parallel to each other, an integral cross member comprising upper and lower portions each extending from one glider to the other and extending at each end thereof over both said side walls of both gliders and juxtaposed in flatwise surface contact with the remaining walls of each of said gliders, and means rigidly securing said upper and lower portions of said cross member to each other and to said gliders preventing said gliders from turning and from being displaced laterally with respect to said cross member and with respect to each other.

References Cited in the file of this patent

UNITED STATES PATENTS

| | | |
|---|---|---|
| 132,803 | Clarke | Nov. 5, 1872 |
| 291,192 | Jackson | Jan. 1, 1884 |
| 468,010 | Wood | Feb. 2, 1892 |
| 604,085 | Richards | May 17, 1898 |
| 1,730,319 | Dilks | Oct. 1, 1929 |
| 1,878,983 | Harris | Sept. 20, 1932 |
| 2,196,892 | Berndt | Apr. 9, 1940 |
| 2,370,048 | Koch | Feb. 20, 1945 |
| 2,509,749 | Thomson | May 30, 1950 |

FOREIGN PATENTS

| | | |
|---|---|---|
| 806,993 | France | Dec. 30, 1936 |